United States Patent
Han et al.

(10) Patent No.: US 10,445,920 B2
(45) Date of Patent: Oct. 15, 2019

(54) METHODS, APPARATUS AND SYSTEM FOR ANALYTICS REPLAY UTILIZING RANDOM SAMPLING

(71) Applicant: Business Objects Software Ltd., Dublin (IE)

(72) Inventors: Qiang Han, Vancouver (CA); Alexei Potiagalov, Richmond (CA); Ivailo Ivanov, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 0 days.

(21) Appl. No.: 15/713,032

(22) Filed: Sep. 22, 2017

(65) Prior Publication Data

US 2018/0012391 A1    Jan. 11, 2018

Related U.S. Application Data

(63) Continuation of application No. 13/828,681, filed on Mar. 14, 2013, now Pat. No. 9,811,938.

(51) Int. Cl.
  *G06T 11/20*    (2006.01)
  *G06T 13/80*    (2011.01)

(52) U.S. Cl.
  CPC ........... *G06T 13/80* (2013.01); *G06T 11/206* (2013.01)

(58) Field of Classification Search
  CPC ................. G06T 13/00–80; G06T 11/206
  See application file for complete search history.

(56) References Cited

U.S. PATENT DOCUMENTS

| | | | |
|---|---|---|---|
| 5,864,342 A | 1/1999 | Kajiya et al. |
| 5,878,426 A | 3/1999 | Plasek et al. |
| 5,890,150 A | 3/1999 | Ushijima et al. |
| 5,937,415 A | 8/1999 | Sheffield et al. |
| 6,160,559 A | 12/2000 | Omtzigt |
| 6,313,838 B1 | 11/2001 | Deering |
| 6,384,821 B1 | 5/2002 | Borrel et al. |
| 7,028,054 B2 | 4/2006 | Harper et al. |
| 7,610,272 B2 | 10/2009 | Zurek |
| 8,522,151 B2 | 8/2013 | Robertson et al. |
| 8,612,180 B2 | 12/2013 | Yan et al. |
| 8,650,150 B2 | 2/2014 | Zhao et al. |
| 8,682,710 B2 | 3/2014 | Dennard et al. |
| 8,775,941 B1 | 7/2014 | Deshpande et al. |
| 9,811,938 B2 | 11/2017 | Han et al. |
| 2003/0004973 A1 | 1/2003 | Harper et al. |

(Continued)

OTHER PUBLICATIONS

Akenine-Moller, Thomas and Eric Haines. "Real-time rendering." 2nd ed. (2002), pp. 99-101. (Year: 2002).*

(Continued)

*Primary Examiner* — Daniel F Hajnik
(74) *Attorney, Agent, or Firm* — Schwegman Lundberg & Woessner, P.A.

(57) ABSTRACT

Methods, systems, and computer program products for visually representing and displaying data are described. The visual representation may be a data animation. A data query may be submitted, a time measurement for processing the query may be obtained, and a sample size of the query may be adjusted based on the time measurement and a frame refresh rate of a data animation. A data animation may be generated based on one or more results of the query.

20 Claims, 10 Drawing Sheets

(56) References Cited

U.S. PATENT DOCUMENTS

| | | | |
|---|---|---|---|
| 2004/0032410 A1* | 2/2004 | Ryan | G06T 15/20 345/427 |
| 2004/0059743 A1 | 3/2004 | Burger | |
| 2004/0221053 A1* | 11/2004 | Codella | H04L 47/10 709/231 |
| 2006/0112123 A1 | 5/2006 | Clark et al. | |
| 2006/0282436 A1 | 12/2006 | Chaudhuri et al. | |
| 2010/0312762 A1 | 12/2010 | Yan et al. | |
| 2010/0321410 A1* | 12/2010 | Jenks | G06F 3/1446 345/676 |
| 2012/0044251 A1 | 2/2012 | Mark et al. | |
| 2012/0105452 A1* | 5/2012 | Diard | G06T 3/40 345/428 |
| 2012/0313957 A1 | 12/2012 | Fisher et al. | |
| 2013/0076756 A1 | 3/2013 | Pritting | |
| 2013/0083034 A1 | 4/2013 | Mandal et al. | |
| 2013/0120358 A1 | 5/2013 | Fan et al. | |
| 2013/0124483 A1 | 5/2013 | Furuhashi et al. | |
| 2013/0346392 A1 | 12/2013 | Weyerhaeuser et al. | |
| 2014/0108234 A1 | 4/2014 | Mayerle et al. | |
| 2014/0156649 A1 | 6/2014 | Bhattacharjee et al. | |
| 2014/0267304 A1 | 9/2014 | Han et al. | |

OTHER PUBLICATIONS

Funkhouser, Thomas A., and Carlo H. Séquin. "Adaptive display algorithm for interactive frame rates during visualization of complex virtual environments." Proceedings of the 20th annual conference on Computer graphics and interactive techniques. ACM, 1993. (Year: 1993).*

"U.S. Appl. No. 13/828,681, Advisory Action dated Jul. 13, 2015", 9 pgs.

"U.S. Appl. No. 13/828,681, Appeal Brief filed Nov. 25, 2015", 27 pgs.

"U.S. Appl. No. 13/828,681, Examiner Interview Summary dated Mar. 30, 2015", 3 pgs.

"U.S. Appl. No. 13/828,681, Examiner Interview Summary dated Apr. 4, 2017", 3 pgs.

"U.S. Appl. No. 13/828,681, Examiner Interview Summary dated Apr. 28, 2016", 3 pgs.

"U.S. Appl. No. 13/828,681, Examiner Interview Summary dated Dec. 16, 2016", 3 pgs.

"U.S. Appl. No. 13/828,681, Examiner Interview Summary, dated Jun. 19, 2015", 3 pgs.

"U.S. Appl. No. 13/828,681, Final Office Action dated Mar. 6, 2017", 16 pgs.

"U.S. Appl. No. 13/828,681, Final Office Action dated May 28, 2015", 16 pgs.

"U.S. Appl. No. 13/828,681, Final Office Action dated Jul. 19, 2016", 26 pgs.

"U.S. Appl. No. 13/828,681, Non Final Office Action dated Mar. 5, 2015", 18 pgs.

"U.S. Appl. No. 13/828,681, Non Final Office Action dated Apr. 6, 2016", 17 pgs.

"U.S. Appl. No. 13/828,681, Non Final Office Action dated Nov. 23, 2016", 14 pgs.

"U.S. Appl. No. 13/828,681 , Notice of Allowance dated Jun. 22, 2017", 5 pgs.

"U.S. Appl. No. 13/828,681, Response filed Jan. 25, 2017 to Non Final Office Action dated Nov. 23, 2016", 15 pgs.

"U.S. Appl. No. 13/828,681, Response filed Apr. 29, 2015 to Non Final Office Action dated Mar. 5, 2015", 17 pgs.

"U.S. Appl. No. 13/828,681, Response filed May 27, 2016 to Non Final Office Action dated Apr. 6, 2016", 13 pgs.

"U.S. Appl. No. 13/828,681, Response filed Jun. 6, 2018 to Final Office Action dated Mar. 6, 2017", 7 pgs.

"U.S. Appl. No. 13/828,681, Response filed Jun. 26, 2015 to Final Office Action dated May 28, 2015", 10 pgs.

"U.S. Appl. No. 13/828,681, Response filed Sep. 13, 2016 to Final Office Action dated Jul. 19, 2016", 14 pgs.

"U.S. Appl. No. 13/828,681,Examiner Interview Summary dated Aug. 19, 2016", 3 pgs.

Walpole, Jonathan, et al., "Player for adaptive MPEG video streaming over the Internet", 26th AIPR Workshop: Exploiting New Image Sources and Sensors. International Society for Optics and Photonics, (1998), 12 pgs.

Yang, Zhenyu, et al., "A multi-stream adaptation framework for bandwidth management in 3D tele-immersion", Proceedings of the 2006 international workshop on Network and operating systems support for digital audio and video. ACM,, (2006), 6 pgs.

"U.S. Appl. No. 13/828,681, Amendment Under 37 CFR 1.312 filed Sep. 22, 2017", 5 pgs.

"U.S. Appl. No. 13/828,681, PTO Response to Rule 312 Communication dated Oct. 2, 2017", 2 pgs.

Fisher, Danyel, et al., "Trust Me, I'm Partially Right: Incremental Visualization Lets Analysts Explore Large Datasets Faster", Chi '12, (Nov. 2012), 1673-1682.

* cited by examiner

| AIRLINE AIRPORT YEAR | NUMBER OF ARRIVALS | PERCENTAGE OF ARRIVAL DELAYS | AVERAGE ARRIVAL DELAY | NUMBER OF DEPARTURES | PERCENTAGE OF DEPARTURE DELAYS | AVERAGE DEPARTURE DELAY |
|---|---|---|---|---|---|---|
| AIRLINE #1 JFK, NY 2000 | 1120 | 23 | 13 | 1137 | 21 | 16 |
| AIRLINE #1 CHICAGO 2000 | 1179 | 18 | 6 | 1182 | 15 | 9 |
| AIRLINE #1 MIAMI 2000 | 1230 | 28 | 16 | 1221 | 27 | 12 |
| AIRLINE #1 LA 2000 | 3920 | 30 | 18 | 3908 | 23 | 13 |
| AIRLINE #2 JFK, NY 2000 | 3998 | 20 | 12 | 4027 | 17 | 10 |
| AIRLINE #2 CHICAGO 2000 | 4055 | 23 | 14 | 4050 | 23 | 14 |
| AIRLINE #2 MIAMI 2000 | 2390 | 12 | 5 | 2380 | 18 | 8 |
| AIRLINE #2 LA 2000 | 2434 | 19 | 12 | 2417 | 23 | 10 |
| AIRLINE #3 JFK, NY 2000 | 2488 | 21 | 11 | 2490 | 25 | 13 |
| AIRLINE #3 CHICAGO 2000 | 3720 | 6 | 5 | 3735 | 12 | 7 |
| AIRLINE #3 MIAMI 2000 | 3777 | 9 | 6 | 3779 | 18 | 9 |
| AIRLINE #3 LA 2000 | 3831 | 7 | 4 | 3821 | 11 | 8 |
| AIRLINE #1 JFK, NY 2001 | 1080 | 22 | 14 | 1101 | 23 | 15 |
| AIRLINE #1 CHICAGO 2001 | 1156 | 15 | 8 | 1171 | 14 | 10 |
| AIRLINE #1 MIAMI 2001 | 1175 | 18 | 15 | 1198 | 16 | 13 |
| AIRLINE #1 LA 2001 | 3775 | 22 | 15 | 3767 | 24 | 15 |
| AIRLINE #2 JFK, NY 2001 | 3820 | 12 | 9 | 3811 | 18 | 11 |
| AIRLINE #2 CHICAGO 2001 | 3869 | 24 | 13 | 3873 | 28 | 14 |

*FIG. 1A*

| AIRLINE AIRPORT YEAR | NUMBER OF ARRIVALS | PERCENTAGE OF ARRIVAL DELAYS | AVERAGE ARRIVAL DELAY | NUMBER OF DEPARTURES | PERCENTAGE OF DEPARTURE DELAYS | AVERAGE DEPARTURE DELAY |
|---|---|---|---|---|---|---|
| AIRLINE #2 MIAMI 2001 | 2112 | 10 | 4 | 2156 | 8 | 3 |
| AIRLINE #2 LA 2001 | 2115 | 16 | 11 | 2116 | 16 | 12 |
| AIRLINE #3 JFK, NY 2001 | 2209 | 19 | 13 | 2189 | 23 | 15 |
| AIRLINE #3 CHICAGO 2001 | 3550 | 5 | 3 | 3602 | 8 | 7 |
| AIRLINE #3 MIAMI 2001 | 3578 | 9 | 4 | 3565 | 13 | 7 |
| AIRLINE #3 LA 2001 | 3602 | 11 | 7 | 3614 | 18 | 12 |
| AIRLINE #1 JFK, NY 2002 | 975 | 21 | 11 | 977 | 19 | 9 |
| AIRLINE #1 CHICAGO 2002 | 997 | 13 | 4 | 1021 | 13 | 7 |
| AIRLINE #1 MIAMI 2002 | 1045 | 26 | 13 | 1035 | 28 | 15 |
| AIRLINE #1 LA 2002 | 3488 | 32 | 17 | 3501 | 29 | 14 |
| AIRLINE #2 JFK, NY 2002 | 3525 | 23 | 10 | 3532 | 28 | 11 |
| AIRLINE #2 CHICAGO 2002 | 3605 | 20 | 12 | 3587 | 23 | 10 |
| AIRLINE #2 MIAMI 2002 | 1998 | 14 | 7 | 1978 | 17 | 8 |
| AIRLINE #2 LA 2002 | 2043 | 14 | 11 | 2034 | 19 | 12 |
| AIRLINE #3 JFK, NY 2002 | 2094 | 23 | 13 | 2078 | 28 | 14 |
| AIRLINE #3 CHICAGO 2002 | 3396 | 7 | 2 | 3412 | 12 | 5 |
| AIRLINE #3 MIAMI 2002 | 3436 | 4 | 4 | 3389 | 18 | 5 |
| AIRLINE #3 LA 2002 | 3479 | 10 | 3 | 3476 | 18 | 7 |

METHODS, APPARATUS AND SYSTEM FOR ANALYTICS REPLAY UTILIZING RANDOM SAMPLING

CROSS-REFERENCE TO RELATED APPLICATIONS

This application is a continuation of prior application Ser. No. 13/828,681, filed on Mar. 14, 2013, which is incorporated by reference herein in its entirety.

FIELD

The present disclosure relates to displaying information. In an example embodiment, the disclosure relates to visually representing data and displaying data animations.

BACKGROUND

Data animation is a process for summarizing and displaying data using an animation comprising a sequence of frames. The underlying data may reside in a database and/or may be modeled using a plurality of dimensions. Each frame of the animation may, for example, correspond to a different period of time and may comprise one or more plots, graphs and/or charts. The plots, graphs and/or charts may be based on two or more data variables. Each axis of the plot, graph or chart may represent a different dimension or measure. In addition, the data region of the plot, graph or chart may expose additional measures and/or dimensions of the underlying data. For example, a scatter plot may utilize different colors to visualize an otherwise hidden dimension.

In analyzing data, users may search for recurring patterns (e.g., clustering and the like), trends, and correlations. The underlying data may be represented using one or more measures and one or more dimensions. As the amount of data increases, the potential for data patterns to be hidden may increase. For example, viewing a summary of sales information over a period of twenty years may obscure data patterns that would be apparent in viewing sales information over a period of one year. Similarly, as the number of dimensions increases, the data may become more difficult to visualize.

An example of a potentially hidden data pattern is a shift in buying behavior that slowly occurs over an extended time period, e.g., ten years. Cumulative sales data for the ten year period may suppress a data pattern showing strong sales in the early years and weak sales in the latter years. Visualizing the underlying data may expose the shift in buying behavior. By sequentially displaying a plurality of frames of an animation at a specified refresh rate, patterns and trends may be recognized. Due to the requirements of a particular frame refresh rate and the time required to generate each frame, however, it may be difficult to create a data animation in substantially real-time.

BRIEF DESCRIPTION OF DRAWINGS

The present disclosure is illustrated by way of example and not limitation in the figures of the accompanying drawings, in which like references indicate similar elements and in which:

FIGS. 1A and 1B illustrate an example data structure of the underlying data for an example data animation based on arrival delay and departure delay information for a plurality of airlines, in accordance with one example embodiment;

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, and computer program products for visually displaying data are described. The visually displayed data may assist a user in interpreting a data space that may be difficult to view due to human perceptual limitations, and limited human domain knowledge. In one example embodiment, a data animation of frames comprising plots, graphs, and/or charts may be displayed. Each frame of the animation may be displayed as a still frame, or as a sequence of frames played at a selected frame rate.

Example Data Configuration

FIGS. 1A and 1B illustrate an example data structure 100 of the underlying data for an example data animation based on arrival delay and departure delay information for a plurality of airlines, in accordance with one example embodiment. (The example arrival delay and departure delay information was compiled by the Research and Innovative Technology Administration and the United States Department of Transportation.) Each row 104 may correspond to a particular airline, airport, and period of time (e.g., one day or one year), as may be indicated in column 106. Column 108 may correspond to a number of arrival flights, column 112 may correspond to the percentage of delayed arrival flights, column 116 may correspond to the average arrival delay (in minutes), column 120 may correspond to a number of departure flights, column 124 may correspond to the percentage of delayed departure flights, and column 128 may correspond to the average departure delay (in minutes). While the example data structure 100 represents three airlines, four airports, and three time periods, a data structure 100 may represent tens of airlines, hundreds of airports, and thousands of time periods, and may comprise millions of rows of data.

Figure 1C:
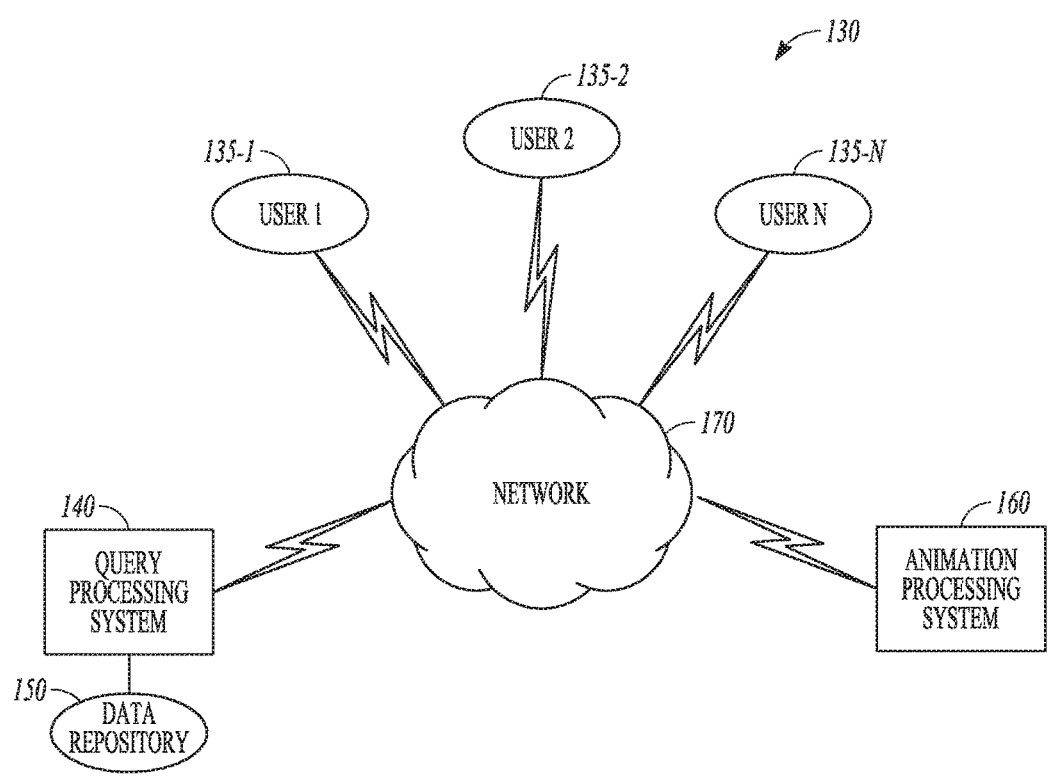
FIG. 1C is a block diagram of an example system, in accordance with an example embodiment, for generating and/or viewing data animations.

FIG. 1C is a block diagram of an example system 130, in accordance with an example embodiment, for generating and/or viewing data animations. In one example embodiment, the system 130 may comprise one or more user devices (e.g., user device 135-1, 135-2, . . . 135-N; known as "user device 135" hereinafter), a query processing system 140, a data repository 150, an animation processing system 160, and a network 170. In one example embodiment, user device 135 may be a personal computer (PC), a cellular phone, a personal digital assistant (PDA), or any other appropriate computer device. User device 135 may be used to request and view a data animation, in accordance with an example embodiment.

Query processing system 140 may accept a query and may provide a query result. In one example embodiment, the query processing system 140 may determine an amount of time to process a query and/or may generate a frame of a data animation based on the query results. Data repository 150 may store one or more of: underlying data (e.g., data structure 100), one or more query results, and/or one or more generated frames of a data animation.

Network 170 may be a local area network (LAN), a wireless network, a metropolitan area network (MAN), a wide area network (WAN), a wireless network, a network of interconnected networks, the public switched telephone network (PSTN), and the like.

In one example embodiment, the animation processing system 160 may formulate a query and forward the query to the query processing system 140. In one example embodiment, the animation processing system 160 may generate one or more frames of a data animation. The animation processing system 160 may set a sample size of the query based upon a frame refresh rate of the data animation, as described more fully below.

Figure 2:
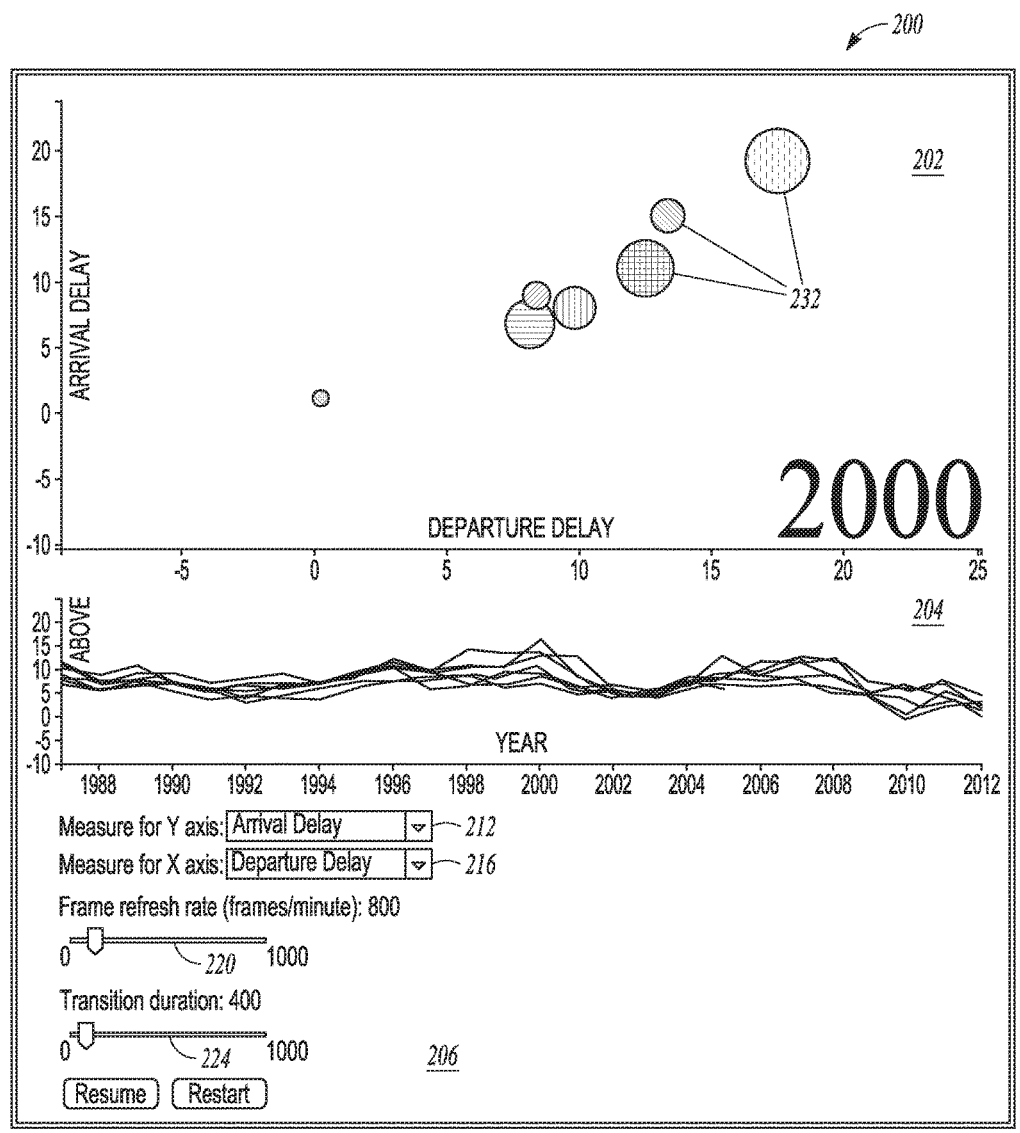
FIGS. 2-5 are example frames of an example data animation based on arrival delay and departure delay information for a plurality of airlines, in accordance with one example embodiment.
Figure 3:
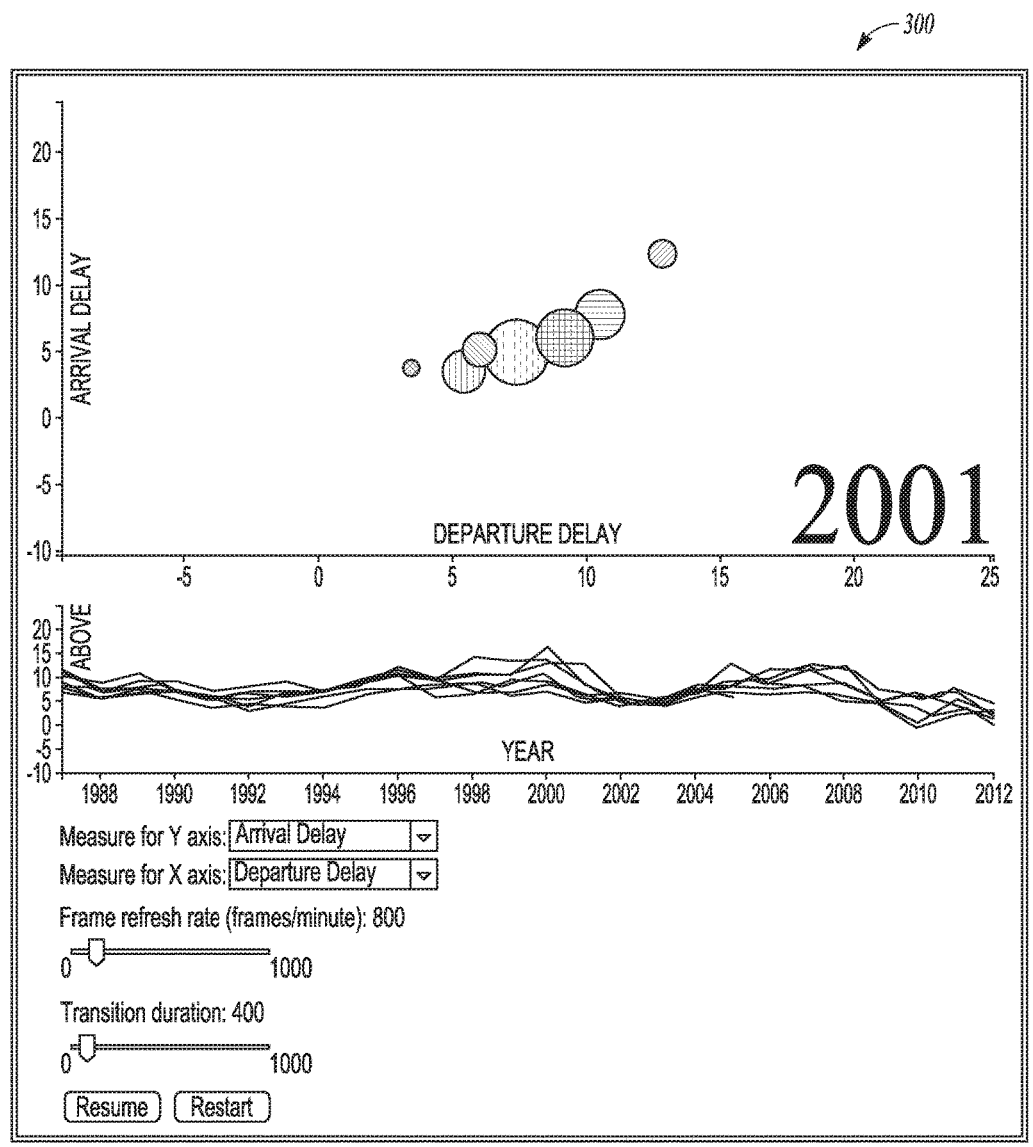
Figure 4:
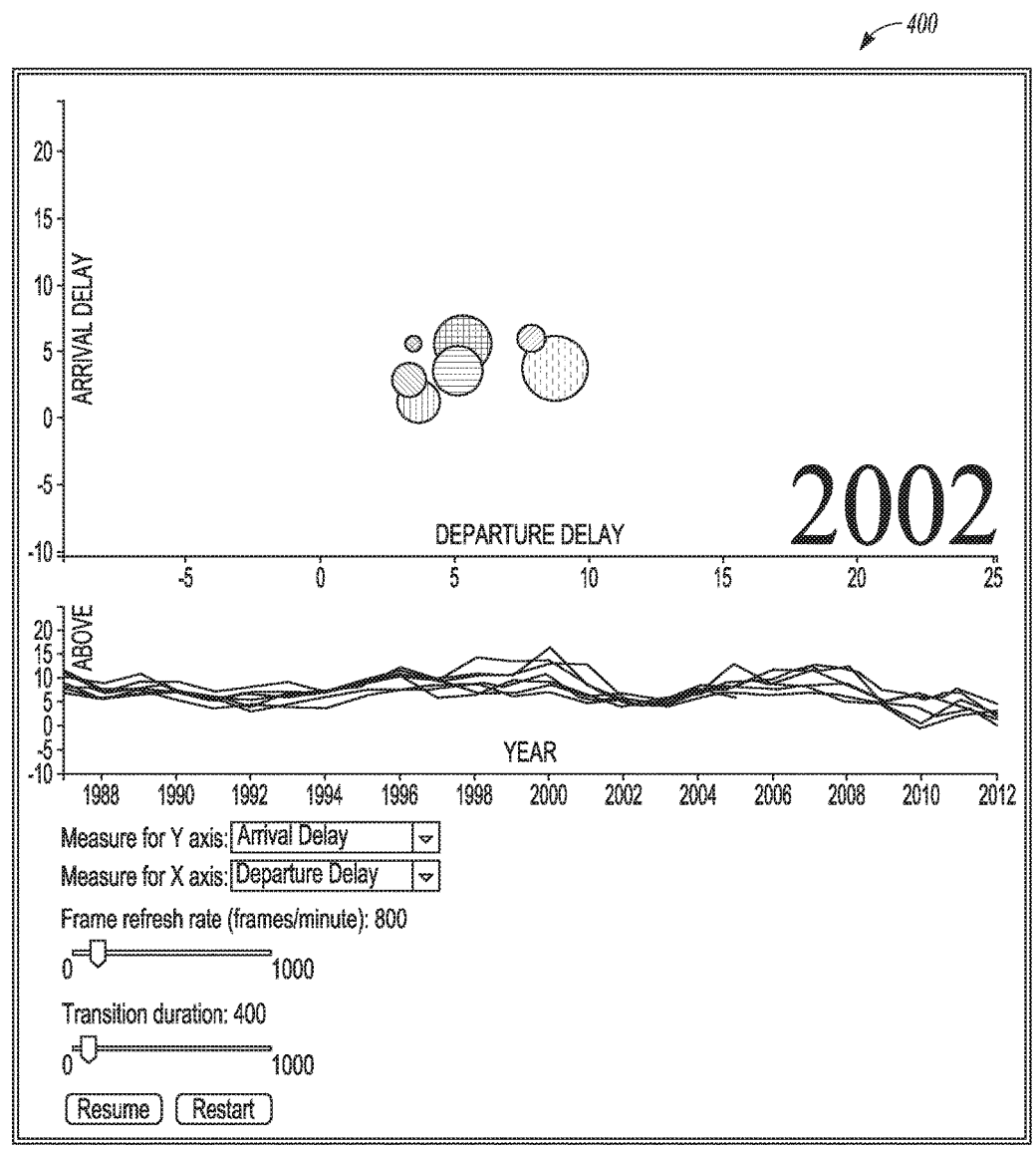
Figure 5:
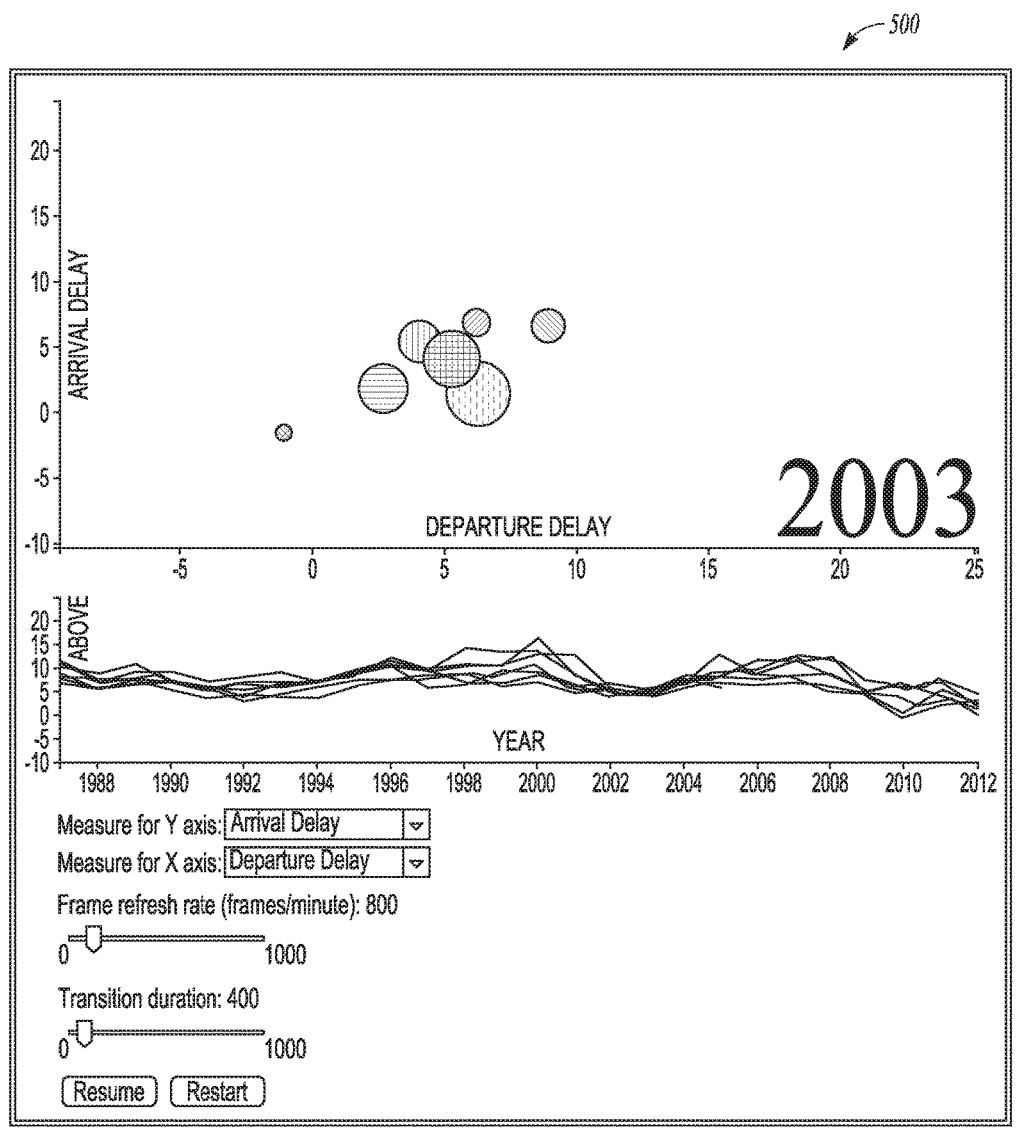

FIG. 2 is an example frame 200 of an example data animation based on arrival delay and departure delay information for a plurality of airlines, in accordance with one example embodiment. The frame 200 may comprise a bubble chart area 202, a plot area 204, and a set of input controls 206. The frame 200 may correspond, for example, to data for a particular time period. For example, the frame 200 may correspond to data for the year 2000. The measure for the y-axis may be selected to represent "Arrival Delay" (input 212). The measure for the x-axis may be selected to represent "Departure Delay" (input 216). Each bubble 232 of the data region may correspond to a specific airline, and the size of each bubble 232 may represent the number of flights conducted by the corresponding airline for the year 2000. The coordinates corresponding to the bubble 232 may represent the values of the calculated measures. For example, the x-coordinate of a bubble 232 may correspond to the average departure delay for the corresponding airline and the y-coordinate of the bubble 232 may correspond to the average arrival delay for the corresponding airline.

Hidden relationships may be revealed by enabling users to visually explore analytic aspects of data with relative positional information (in contrast to absolute positional information available with a complete data set). For example, data animation may reveal hidden relationships as a correlation among selected data points by focusing on a relative distribution of shapes among data points, as shown in FIG. 2, in comparison to a focus on the actual position of each data point independently.

FIGS. 2-5 represent a sequence of example frames 200, 300, 400, 500 that may be played in a data animation, where each frame 200, 300, 400, 500 corresponds to the data accumulated for a particular period of time, e.g., a period of one year. In one example embodiment, the frame 200 may be viewed as a still frame. In one example embodiment, the frame 200 may be played in a data animation with a series of other frames 200. A user may individually control the display of each frame 200 in the animation, or the frames 200 may be automatically sequentially displayed at a selected frame refresh rate. In one example embodiment, a user may select a frame refresh rate via input 220. For example, a user may select a frame refresh rate of 30 frames per minute by setting input 220.

In one example embodiment, a user may select a frame transition duration via input 224. The frame transition duration may be the time to transition from a current frame 200 to a next frame 200. For example, a user may select a frame transition duration of 0.25 seconds.

In one example embodiment, the time required to generate a frame may exceed the time allotted by a frame refresh rate. For example, if the sample size (e.g., the number of rows) selected for generating the frame is too large, the time required to generate a frame may exceed the time allotted by a frame refresh rate. In one example, a frame rate of 30 frames per minute may require that a frame is provided every two seconds. If greater than two seconds are required for generating the frame, then the time required to generate a frame may exceed the time allotted by the frame refresh rate. In one example embodiment, the sample size may be dynamically adjusted based on the frame refresh rate and/or the time allocated to generate a frame.

In one example embodiment, the system may make a database call to calculate boundaries for the selected measures for each applicable year (by each airline). In one example embodiment, the database query may constrain the result set to a specified sample size in order, for example, to achieve a particular response time. For example, the underlying data may contain one million rows of data, where approximately fifty thousand rows of data (a slice of the data) may correspond to each year. The processing of fifty thousand rows of data may exceed the time allotted by the frame refresh rate. In one example embodiment, a sample size may be dynamically selected and a number of rows may be processed based on the selected sample size. For example, a sample comprising a subset of rows may be selected for processing and, as a result, the processing may be performed within the time allotted by the frame refresh rate. The sample may be substantially uniformly distributed across the applicable slice of data.

In one example embodiment, a sample size may be selected and the corresponding number of rows of the database may be processed within the time allotted by the frame rate and the results may be displayed on a computer screen. For example, a query for a selected measure (e.g. average airline flight delay time) based on a sample size of 2,500 rows of data may be processed and displayed. The execution time for the database query may be compared to the selected frame refresh rate and the sample size may be adjusted for the next iteration of processing (e.g., for the generation of the next frame utilizing the next slice of data). In one example embodiment, the sample size may be set to the maximum number of rows that corresponds to a query execution time of less than the time allotted by the frame refresh rate. In one example embodiment, a target query execution time is proportional to a frame refresh time period (i.e., the inverse of the frame refresh rate) multiplied by a margin value. In one example embodiment, a target query execution time is set equal to a frame refresh time period multiplied by a margin value. For example, the inverse of a frame refresh rate of 30 frames per minute would correspond to a frame refresh time period of two seconds. If an example margin value of 75% is selected, the target query execution time would be 1.5 seconds. The sample size may be adjusted such that the query execution time is equal to or less than the target query execution time.

In one example embodiment, random sampling may be performed by querying a database table and constraining the results using a "random number" column. The "random number" column may contain values from 0.0 to 1.0 that are randomly and substantially uniformly distributed across the rows of a database table. A filter condition may be used to sample the data. For example, a filter condition including values from 0.0 to 1.0 may include all data in the database table (i.e., the population); a filter condition including a smaller range of values, e.g. 0.50 to 1.0, may be selected to provide a suitable sample of the data. In one example embodiment, the sampling may enable a reduction in the size of the data being viewed without a bias of the original data distribution by utilizing random sampling. In one example embodiment, the system can be extended to estimate a population's summaries from a sample. This may be accomplished by prorating the summaries. In one example embodiment, stratified sampling may be used to produce a substantially uniformly distributed random sampling of the data structure.

Figure 6:
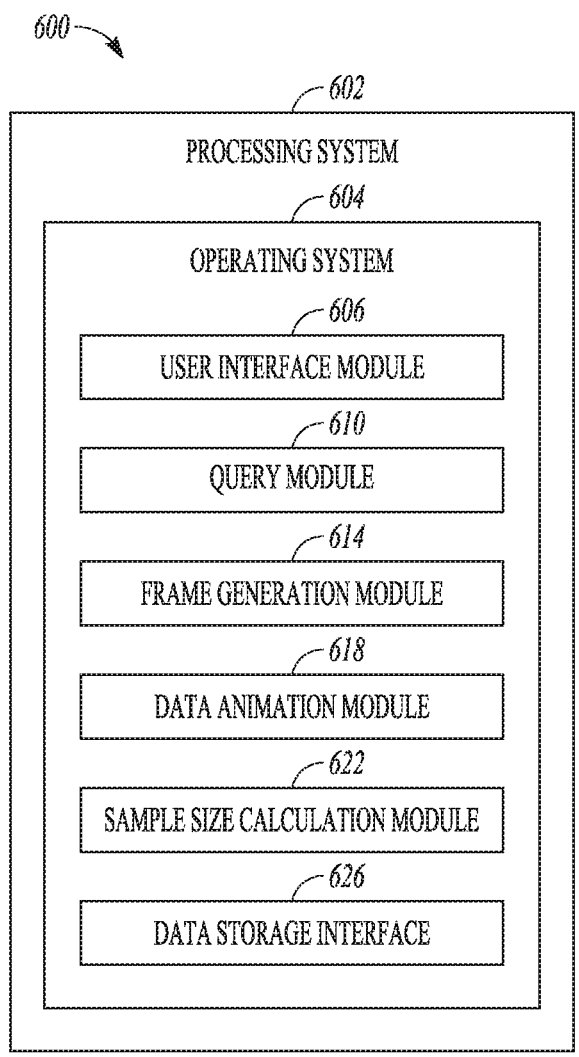
FIG. 6 is a block diagram of an apparatus for visually displaying data, in accordance with an example embodiment.

FIG. 6 is a block diagram of an apparatus for visually displaying data, in accordance with an example embodiment. For example, the apparatus 600 may be used to generate a data animation and, accordingly, is described by way of example with reference thereto.

The apparatus 600 is shown to include a processing system 602 that may be implemented on a server, client, or other processing device that includes an operating system 604 for executing software instructions. In accordance with an example embodiment, the apparatus 600 may include a user interface module 606, a query module 610, a frame generation module 614, a data animation module 618, and a sample size calculation module 622. In accordance with an example embodiment, the apparatus 600 may include a data storage interface 626.

The user interface module 606 may provide for the selection of a data animation and a frame refresh rate, and may present a still frame or an animation of frames to a user. The user interface module 606 may provide for the selection of various measures and dimensions, and may provide for the selection of the type of mechanism for displaying data. For example, the user interface module 606 may provide for the selection of a scatter plot graph and may provide for the selection of parameters for the scatter plot graph. The query module 610 may generate a query for a database table. The frame generation module 614 may obtain a result of a query on a database table and generate a data frame based on the obtained result. The data animation module 618 may be responsible for coordinating the creation of a data animation comprising a plurality of frames, maintaining the animation, and coordinating the display of the animation in conjunction with the user interface module 606. The sample size calculation module 622 may be responsible for dynamically determining the size of the sample based on the selected frame refresh rate and a time required to generate one or more previous frames. The data storage interface 626 may provide access to, for example, a database(s) that stores the underlying data configuration and/or the generated frame(s).

Figure 7:
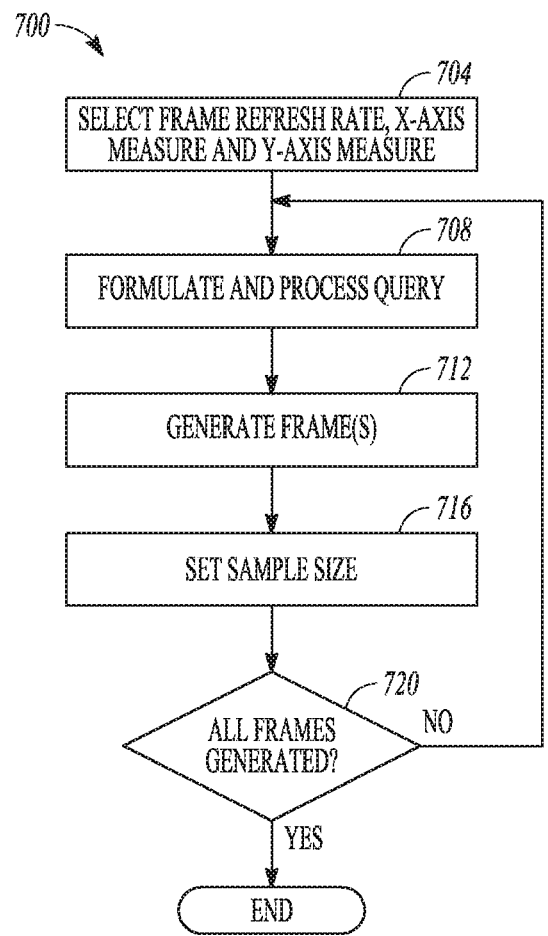
FIG. 7 is an example flowchart for generating a data animation, in accordance with one example embodiment.

FIG. 7 is an example flowchart for generating a data animation, in accordance with one example embodiment. A frame refresh rate, a measure for the X-axis, and a measure for the Y-axis may be selected (operation 704). For example, a frame refresh rate of 30 frames per minute, an X-axis measure of departure delay, and a Y-axis measure of arrival delay may be selected.

Based on the selected measures, a query may be formulated and processed (operation 708). In one example embodiment, the query may include a selected sample size. In one example embodiment, the sample size may initially be based on a predefined default value. In one example embodiment, the sample size may be based on a time required to generate an average data frame.

One or more frames 200 may be generated based on the query results (operation 712). For example, the frames 200 of FIGS. 2-5 may be generated. In one example embodiment, the frames 200 may be components of a data animation.

In one example embodiment, the sample size may be set to a value that enables a frame 200 to be generated within a frame refresh time period. The sample size may be based on an amount of time to generate one or more prior frames (operation 716). In one example embodiment, the amount of time to generate a prior frame may be based on the amount of time to process a query corresponding to a prior frame, and/or the amount of time to generate a prior frame. In one example embodiment, the amount of time to generate a prior frame may be based on the amount of time to process an average query corresponding to a plurality of prior frames, and/or the amount of time to generate an average frame corresponding to a plurality of prior frames.

In one example embodiment, a timer may be used to measure the amount of time between the submission of a query and a reception of the query results to determine an amount of time to generate one or more frames. In one example embodiment, a timer may be used to measure the amount of time between the submission of a query and the completion of a generated frame(s) to determine an amount of time to generate one or more frames. In one example embodiment, the query results may include a value indicating the amount of time required to process the corresponding query and/or to process an average query based on a plurality of previous queries.

In one example embodiment, the sample size may be increased if the obtained time measurement is smaller than an inverse of the frame refresh rate and the sample size may be decreased if the obtained time measurement exceeds the inverse of the frame refresh rate. In one example embodiment, the sample size may be increased if the obtained time measurement multiplied by a multiplication factor is smaller than an inverse of the frame refresh rate and the sample size may be decreased if the obtained time measurement multiplied by the multiplication factor exceeds the inverse of the frame refresh rate.

In one example embodiment, a test may be performed to determine if all desired frames have been generated (operation 720). If all desired frames have not been generated, the method may transition to operation 708. If all desired frames have been generated, the method may end.

Figure 8:
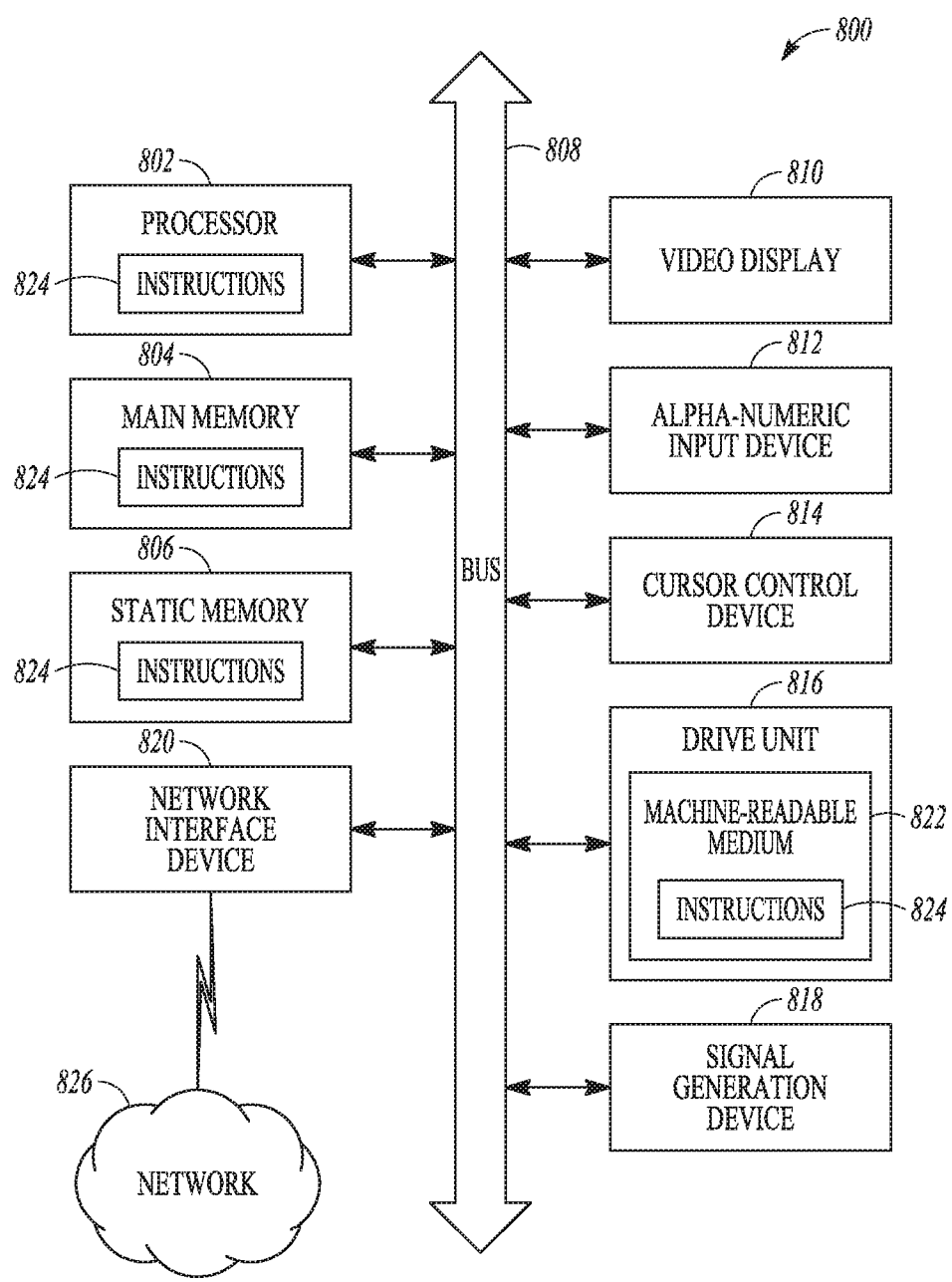
FIG. 8 is a block diagram of a computer processing system within which a set of instructions, for causing the computer to perform any one or more of the methodologies discussed herein, may be executed.

FIG. 8 is a block diagram of a computer processing system 800 within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (SIB), a PDA, cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 800 includes processor 802 (e.g., a central processing unit (CPU), a graphics processing unit (GPU) or both), main memory 804 and static memory 806, which communicate with each other via bus 808. The processing system 800 may further include video display unit 810 (e.g., a plasma display, a liquid crystal display (LCD) or a cathode ray tube (CRT)). The processing system 800 also includes alphanumeric input device 812 (e.g., a keyboard), a cursor control device 814 (e.g., a mouse, touch screen, or the like), a disk drive unit 816, a signal generation device 818 (e.g., a speaker), and a network interface device 820.

The disk drive unit 816 includes machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the processing system 800, the main memory 804 and the processor 802 also constituting computer-readable, tangible media.

The instructions 824 may further be transmitted or received over network 826 via a network interface device 820 utilizing any one of a number of well-known transfer protocols (e.g., Hypertext Transfer Protocol).

While the machine-readable medium 822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processors may be located in a single location (e.g., within a home environment, an office environment, or as a server farm), while in other embodiments the processors may be distributed across a number of locations.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method for generating an animated data visualization, the method comprising:
   executing a first data query on a data structure in a database, the first data query having a first sample size describing a first number of rows at the data structure retrieved by the first data query;
   determining, using one or more hardware processors, a time measurement for performing the first data query, the time measurement being an amount of time between a submission of the first data query and obtaining a first data query result;
   selecting, using the one or more hardware processors, a second sample size based on the time measurement and a frame refresh rate, wherein the second sample size describes a second number of rows at the data structure, and wherein the second number of rows at the data structure is different than the first number of rows;
   executing a second data query on the data structure, the second data query having the second sample size; and
   generating, using the one or more hardware processors, the animated data visualization based on one or more results of the second data query.

2. The method of claim 1, wherein the second number of rows is larger than the first number of rows if the time measurement multiplied by a multiplication factor is smaller than an inverse of the frame refresh rate, wherein the multiplication factor is not equal to zero or one.

3. The method of claim 1, wherein the second number of rows is smaller than the first number of rows if the time measurement multiplied by a multiplication factor equals or exceeds an inverse of the frame refresh rate, wherein the multiplication factor is not equal to zero or one.

4. The method of claim 1, wherein the first data query and the second data query are characterized by a substantially uniformly distributed random sampling of a data structure.

5. The method of claim 1, wherein the animated data visualization utilizes a relative distribution of shapes to highlight one or more selected relationships.

6. The method of claim 1, wherein the time measurement for performing the first query includes time for generating a data frame.

7. The method of claim 1, wherein the second number of rows is a maximum number of rows that correspond to a query execution time of less than a time allotted by the frame refresh rate.

8. The method of claim 1, wherein the time measurement is obtained by determining an average amount of time to obtain a query result for each of a plurality of queries.

9. The method of claim 1, wherein the time measurement is provided as an output of the first query.

10. The method of claim 1, wherein the first sample size is set to a default sample size.

11. An apparatus for generating an animated data visualization, the apparatus comprising:
    memory to store instructions; and
    one or more hardware processors to execute the instructions to perform operations comprising:
      executing a first data query on a data structure in a database, the first data query having a first sample size describing a first number of rows at the data structure retrieved by the first data query;
      determining a time measurement for performing the first data query, the time measurement being an amount of time between submission of the first data query and obtaining a first data query result;
      selecting a second sample size based on the time measurement and a frame refresh rate, wherein the second sample size describes a second number of rows at the data structure, and wherein the second number of rows at the data structure is different than the first number of rows;
      executing a second data query on the data structure, the second data query having the second sample size; and
      generating the animated data visualization based on one or more results of the second data query.

12. The apparatus of claim 11, wherein the second number of rows is larger than the first number of rows if the time measurement multiplied by a multiplication factor is smaller than an inverse of the frame refresh rate wherein the multiplication factor is not equal to zero or one.

13. The apparatus of claim 11, wherein the second number of rows is smaller than the first number of rows if the time measurement multiplied by a multiplication factor equals or exceeds an inverse of the frame refresh rate wherein the multiplication factor is not equal to zero or one.

14. The apparatus of claim 11, wherein the first data query and the second data query are characterized by a substantially uniformly distributed random sampling of a data structure.

15. The apparatus of claim 11, wherein the animated data visualization utilizes a relative distribution of shapes to highlight one or more selected relationships.

16. The apparatus of claim 11, wherein the time measurement for performing the first query includes time for generating a data frame.

17. The apparatus of claim 11, wherein the second number of rows is a maximum number of rows that correspond to a query execution time of less than a time allotted by the frame refresh rate.

18. The apparatus of claim 11, wherein the time measurement is obtained by determining an average amount of time to obtain a query result for each of a plurality of queries.

19. The apparatus of claim 11, wherein the time measurement is provided as an output of the first query.

20. A non-transitory computer-readable medium embodying instructions that, when executed by a processor perform operations comprising:

executing a first data query on a data structure in a database, the first data query having a first sample size describing a first number of rows at the data structure retrieved by the first data query;

determining a time measurement for performing the first data query, the time measurement being an amount of time between submission of the first data query and obtaining a first data query result;

selecting a second sample size based on the time measurement and a frame refresh rate, wherein the second sample size describes a second number of rows at the data structure, and wherein the second number of rows at the data structure is different than the first number of rows; and generating an animated data visualization based on one or more results of the second data query.

* * * * *